(12) United States Patent
Kokot et al.

(10) Patent No.: US 7,753,148 B2
(45) Date of Patent: Jul. 13, 2010

(54) UNDERDECK PTO/GEARBOX/COMPRESSOR COMBINATION

(75) Inventors: Ralph Kokot, Schereville, IN (US);
Gregory M. Kokot, St. John, IN (US);
Edward M. Vavrek, Valparaiso, IN (US)

(73) Assignee: Vanair Manufacturing, Inc., Michigan City, IN (US)

( * ) Notice: Subject to any disclaimer, the term of this patent is extended or adjusted under 35 U.S.C. 154(b) by 446 days.

(21) Appl. No.: 11/893,749

(22) Filed: Aug. 17, 2007

(65) Prior Publication Data

US 2009/0044992 A1  Feb. 19, 2009

(51) Int. Cl.
*B60K 17/28* (2006.01)
*B60K 25/06* (2006.01)
(52) U.S. Cl. .............. 180/53.8; 180/53.1; 417/364
(58) Field of Classification Search ............ 180/53.1, 180/53.6, 53.7, 53.8; 417/364; 56/6, 7; 74/15.66, 74/15.8, 15.82, 15.86, 665 F, 665 H
See application file for complete search history.

(56) References Cited

U.S. PATENT DOCUMENTS

| | | | | | |
|---|---|---|---|---|---|
| 2,051,784 | A | * | 8/1936 | Davey | 180/53.1 |
| 2,094,421 | A | * | 9/1937 | Wagner | 74/15.86 |
| 2,132,450 | A | * | 10/1938 | Wolf | 180/69.6 |
| 2,168,033 | A | * | 8/1939 | Johnston et al. | 74/15.2 |
| 2,185,842 | A | * | 1/1940 | Flogaus | 180/297 |
| 2,213,196 | A | * | 9/1940 | Bartholomew | 180/53.1 |
| 2,289,396 | A | * | 7/1942 | Waseige | 74/665 H |
| 2,439,686 | A | * | 4/1948 | Findley | 417/44.7 |
| 2,467,077 | A | * | 4/1949 | Brunken | 123/561 |
| 2,512,125 | A | * | 6/1950 | Whited | 417/238 |
| 2,614,396 | A | * | 10/1952 | Ratermann | 62/213 |
| 2,630,872 | A | * | 3/1953 | Roos et al. | 180/53.1 |
| 2,736,202 | A | * | 2/1956 | Wagner | 74/15.86 |
| 2,987,134 | A | * | 6/1961 | Myers | 180/247 |
| 4,158,923 | A | | 6/1979 | Steiner et al. | |
| 4,545,450 | A | * | 10/1985 | Mambelli | 180/53.1 |
| 5,056,601 | A | * | 10/1991 | Grimmer | 165/47 |
| 5,094,309 | A | * | 3/1992 | Vlaanderen et al. | 180/53.7 |
| 5,242,278 | A | | 9/1993 | Vanderslice et al. | |
| 5,557,977 | A | | 9/1996 | Stockton | |
| 6,626,646 | B2 | * | 9/2003 | Rajewski | 417/231 |
| 2008/0141800 | A1 | * | 6/2008 | Seitz et al. | 74/15.82 |
| 2008/0149405 | A1 | * | 6/2008 | Hladun et al. | 180/53.8 |

FOREIGN PATENT DOCUMENTS

JP   05319130 A   * 12/1993

\* cited by examiner

*Primary Examiner*—Paul N. Dickson
*Assistant Examiner*—Laura Freedman
(74) *Attorney, Agent, or Firm*—R. Tracy Crump (57) ABSTRACT

A combination integrates a power take-off unit, a gear box and air compressor into a single component that is mounted to and suspended from the side mount PTO provision of a vehicle transmission. The combination eliminates the need for a separate drive line and provides a reduced footprint for underdeck applications. The combination also reduces the installation difficulties by reducing fluid lines and consolidating component location.

3 Claims, 12 Drawing Sheets

UNDERDECK PTO/GEARBOX/COMPRESSOR COMBINATION

This invention relates to underdeck power take off (PTO) driven air compressors.

BACKGROUND OF THE INVENTION

"Underdeck" power take off (PTO) driven air compressor units are a common feature in utility vehicles. Mounting an air compressor to the vehicle undercarriage beneath the deck eliminated the need for separate tow behind air compressors. The PTO provisions on conventional utility truck transmissions allow side mounted PTO units to power undercarriage mounted air compressors. However, the functional space available for locating an underdeck air compressor unit in a typical utility vehicle is limited by the various vehicle structures and components, such as, frame members, fuel lines, exhaust pipes, electrical wiring and the various other components, devices and apparatus used in utility vehicles. Typically, an under deck air compressor unit is remotely mounted to the vehicle frame and undercarriage and connected to the side mounted PTO unit on the vehicle transmission by a separate drive shaft. Often a gear box is needed inserted into the drive line to reduce the gear ratio between the PTO output drive and the air compressor's input drive. Because of space restrictions and undercarriage obstruction, it is often difficult to operably connect an underdeck air compressor with the PTO unit using a conventional drive line and gear box.

The present invention combines the PTO unit, gear box and air compressor into an integral unit, which eliminates the need for a separate drive line. The PTO/gearbox/compressor combination is directly mounted to and supported from the side PTO provision of the vehicle transmission. The integrated combination of the PTO unit, gearbox and air compressor provides a small footprint for underdeck applications. Integrally mounting the combination to the transmission also reduces the installation difficulties by reducing fluid lines and consolidating component location. The gearbox is lubricated by splash lubrication from fluids circulated from the air compressor under differential pressure.

Theses and other advantages of the present invention will become apparent from the following description of an embodiment of the invention with reference to the accompanying drawings.

BRIEF DESCRIPTION OF THE DRAWINGS

The drawings illustrate an embodiment of the present invention, in which.

DESCRIPTION OF THE PREFERRED EMBODIMENT

Referring now to the drawings, FIGS. 1-8 illustrate an embodiment of the present invention where reference numeral 10 generally designates an "underdeck" PTO/gearbox/compressor combination. Combination 10 is designed and intended to be mounted to a conventional vehicle transmission with a side mounted PTO provision, such as the Ford 5R110 and 4R100 automatic transmissions or the General Motors Allison Transmission GM 3500. Side mounted PTO provisions are well known and common features on manual and automatic transmissions used in utility vehicles. The drawings illustrate a combination mounted to the left side of transmission 2, but the combination can be adapted to be mounted on either side within the teaching of this invention.

Figure 1:
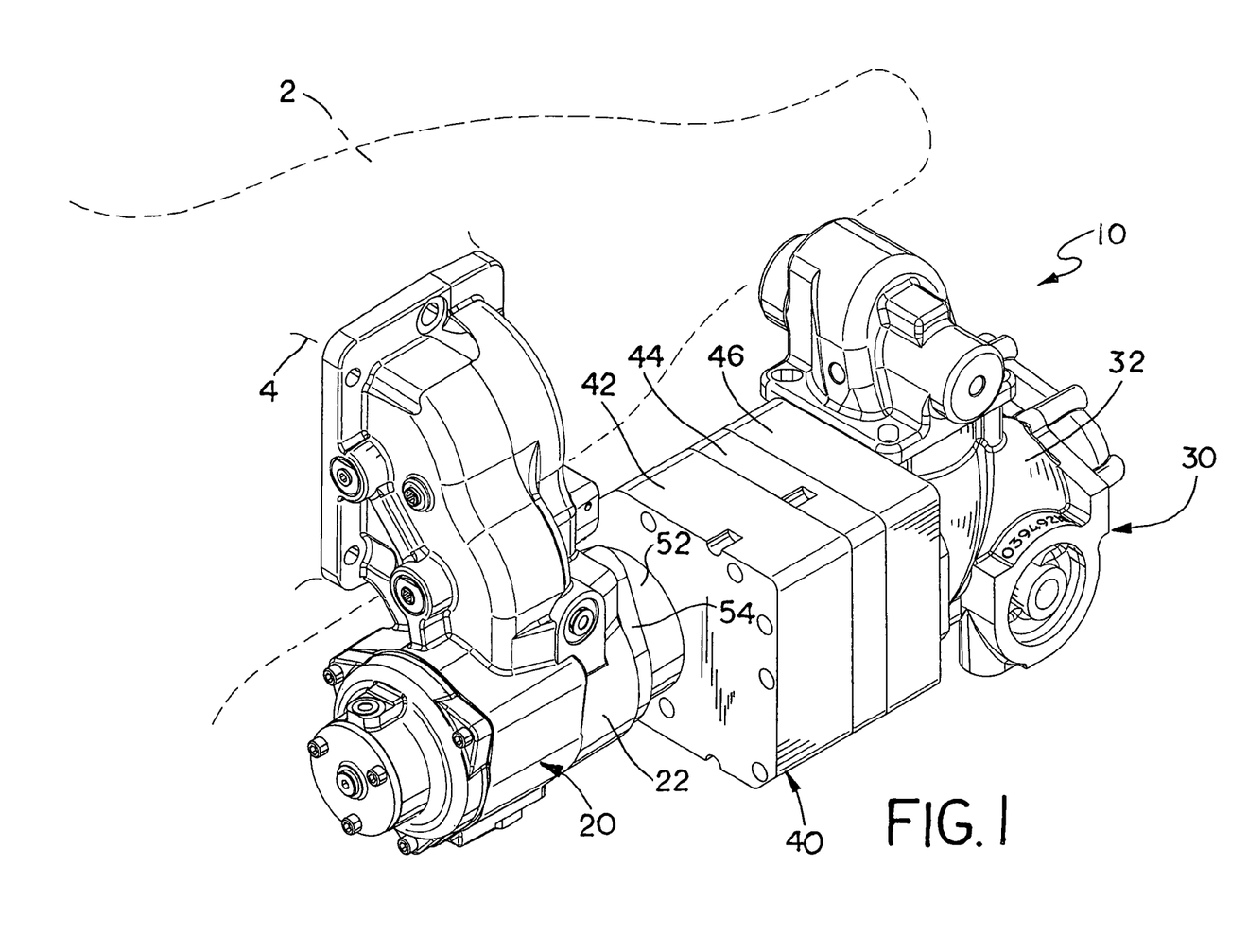
FIG. 1 is a perspective view of an embodiment of the PTO/gearbox/compressor combination of this invention mounted to a vehicle transmission.
Figure 2:
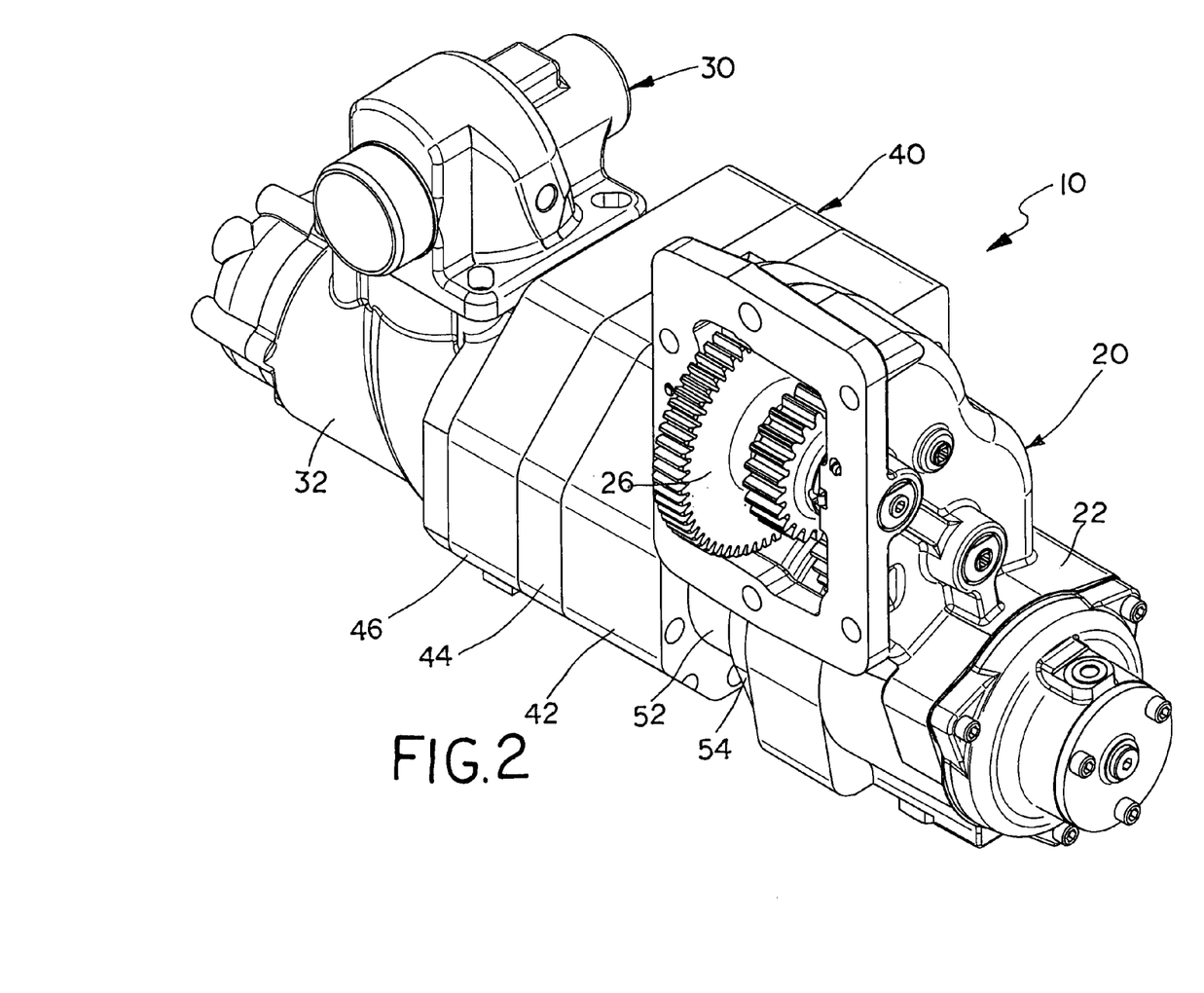
FIG. 2 is another perspective view of the combination of FIG. 1.
Figure 3:
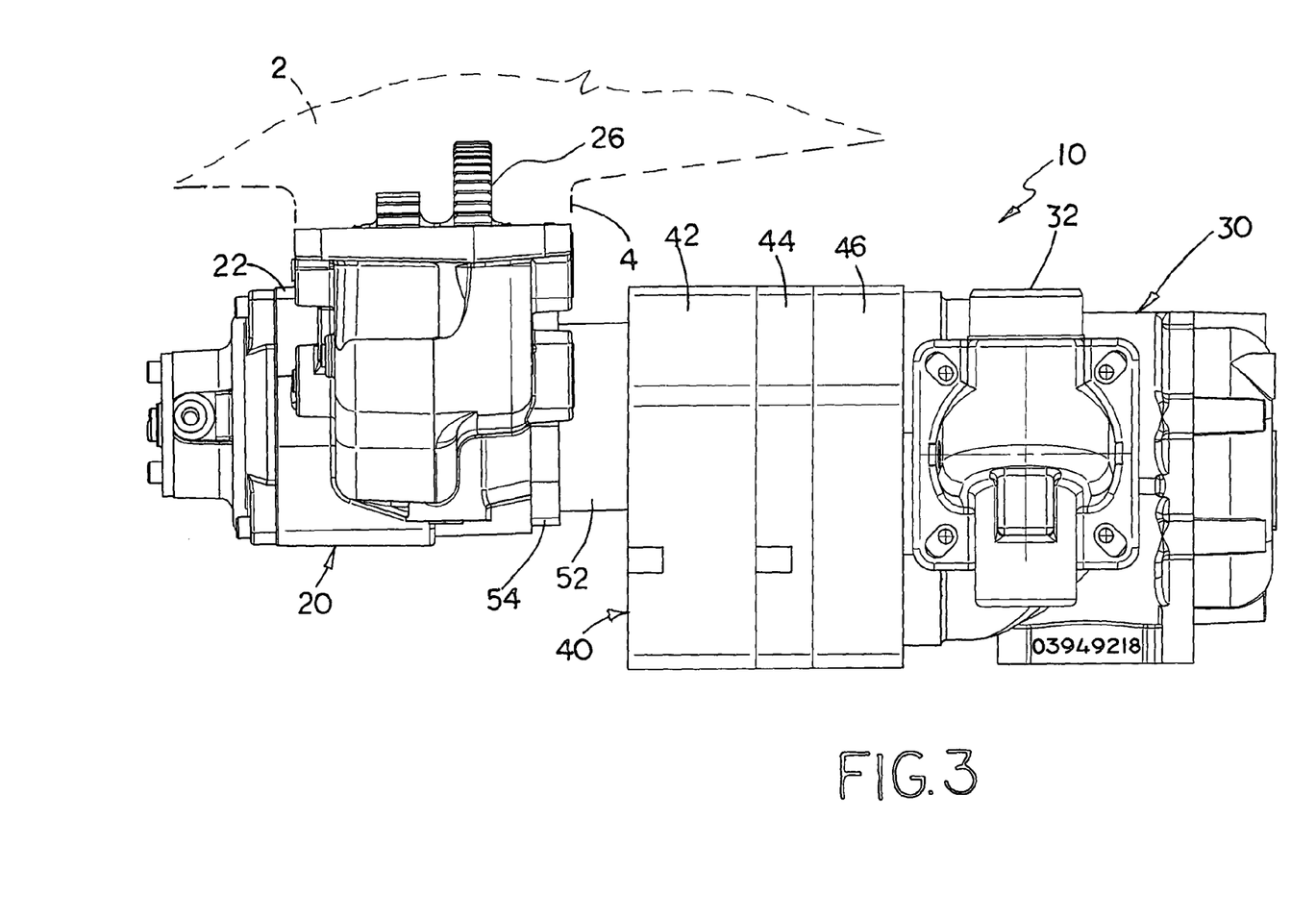
FIG. 3 is a top view of the combination of FIG. 1.

Combination 10 consists of an integrally connected PTO unit 20, air compressor 30 and gearbox 40. PTO unit 20 enable power from the transmission to be used to drive compressor 30. PTO unit 20 is a conventional side mount design, such as the ones manufactured by Munice, Inc. or the Chelsea Products Division of Parker Hannifin Corporation. As shown, PTO unit 20 includes a housing 22 and an output shaft (not shown), which extends from the rear of the PTO housing. PTO housing 22 is mounted directly to transmission 2 over PTO provision 4. PTO unit 20 has a gear set 26 which operatively meshes with the gear set (not shown) of PTO provision port 4. Air compressor 30 is of a conventional rotary screw design, such as the Tamrotor brand compressors manufactured by Gardner Denver of Tampere, Finland. Generally, rotary screw air compressor provides the most rugged and compact design with capacity suitable for moderate air demand underdeck applications, generally 25.0-80.0 cfm.

Figure 4:
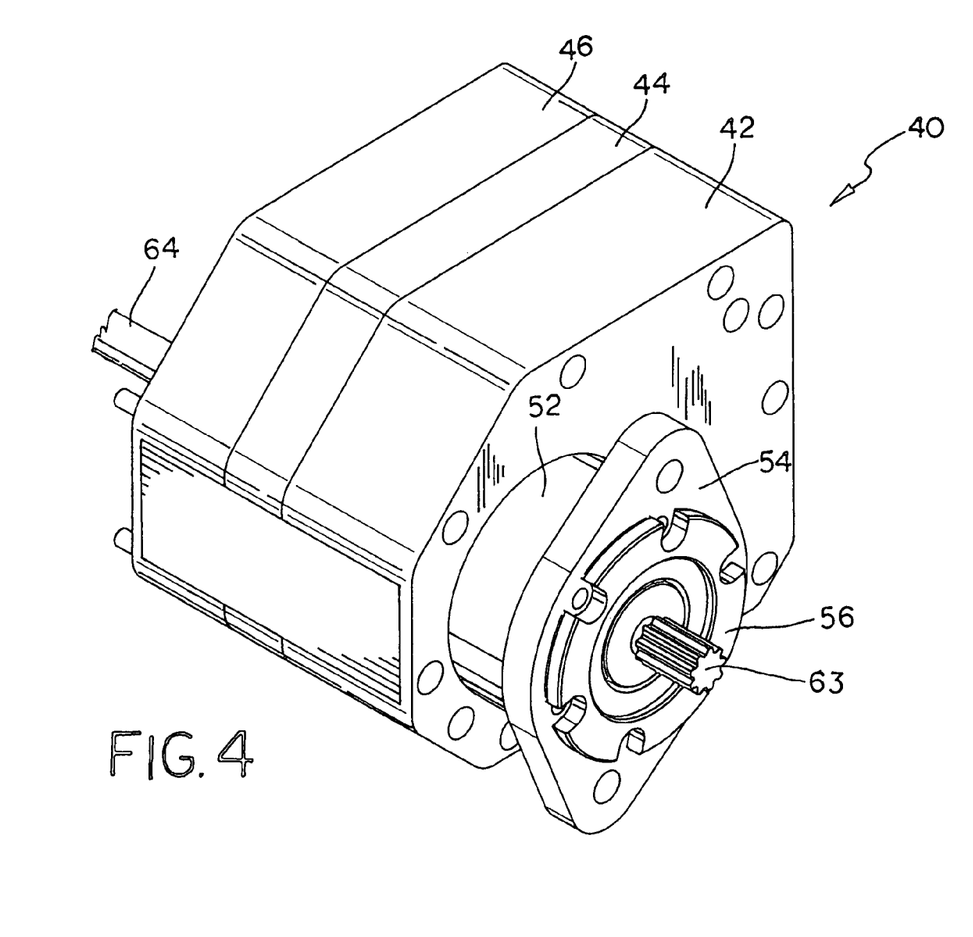
FIG. 4 is a perspective view of the gearbox of FIG. 1.
Figure 5:
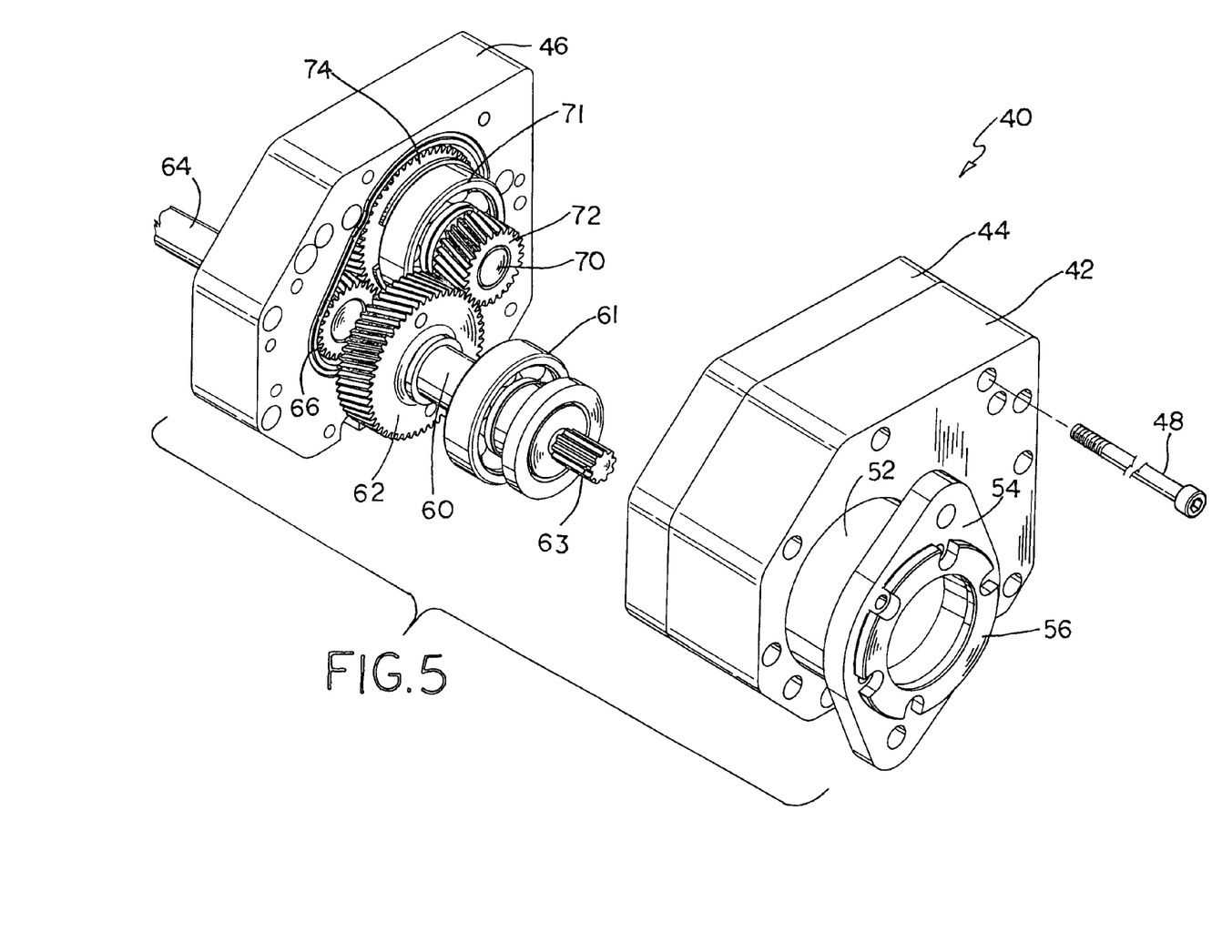
FIG. 5 is a partial exploded view of the gearbox of FIG. 4.
Figure 6:
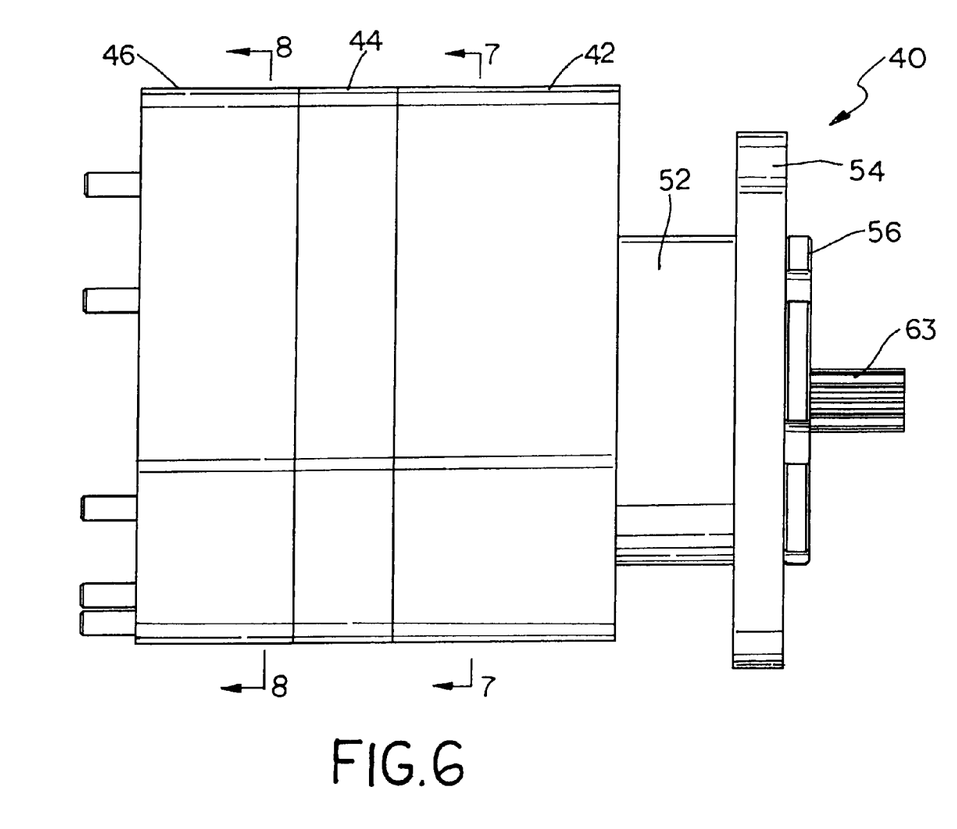
FIG. 6 is a side view of the gearbox of FIG. 4.
Figure 7:
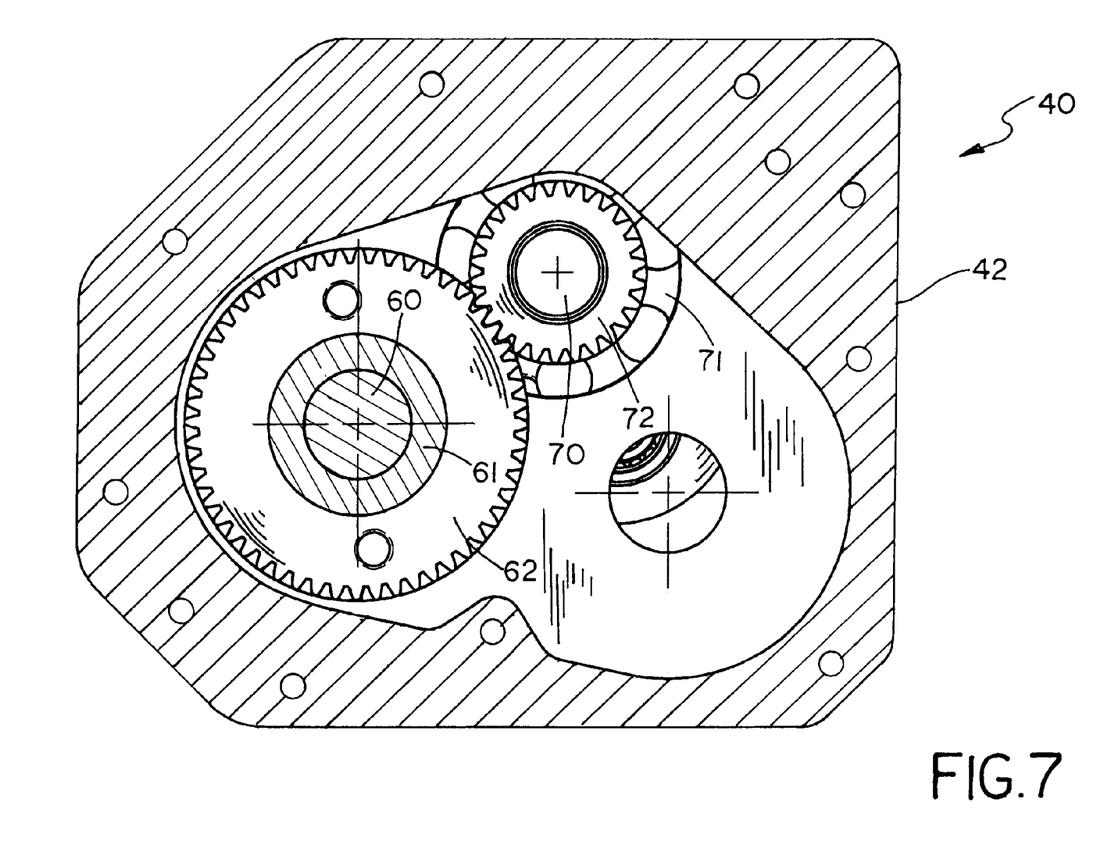
FIG. 7 is a sectional view of the gearbox of FIG. 4 taken along line 7-7.
Figure 8:
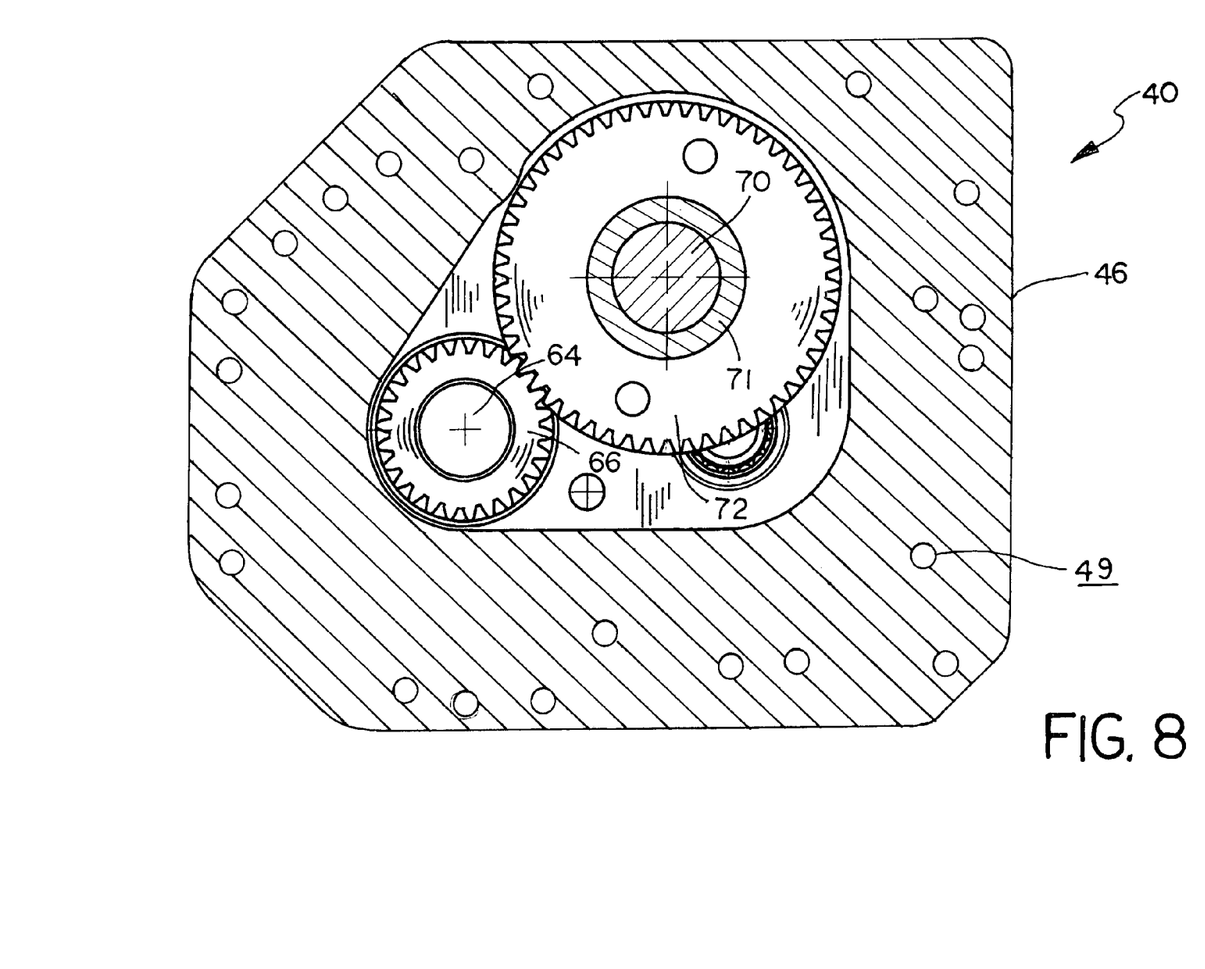
FIG. 8 is a sectional view of the gearbox of FIG. 4 taken along line 8-8.
Figure 9:
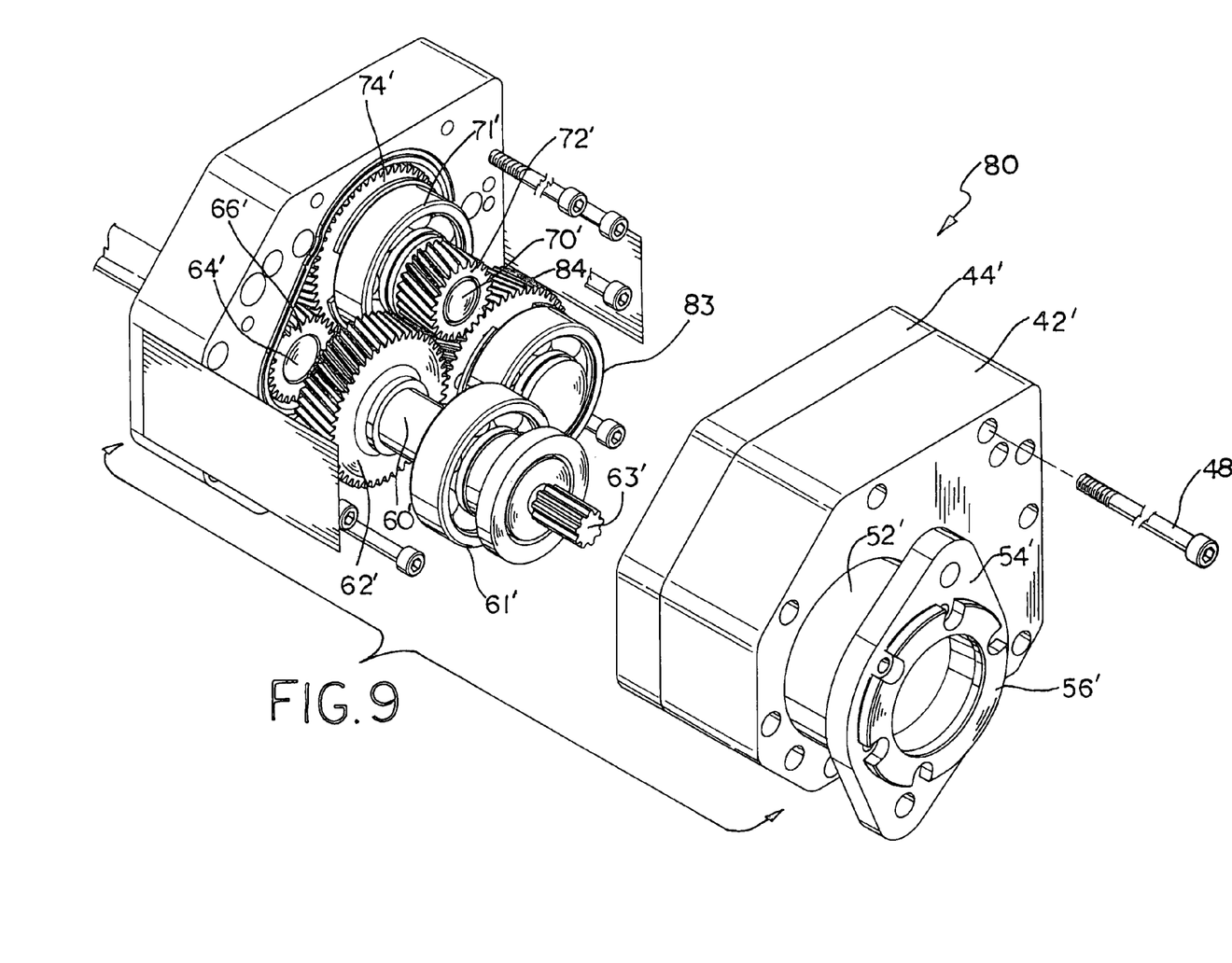
FIG. 9 is a partial exploded view of a second embodiment of the gearbox of this invention used in the PTO/Gearbox/Compressor Combination of this invention.
Figure 10:
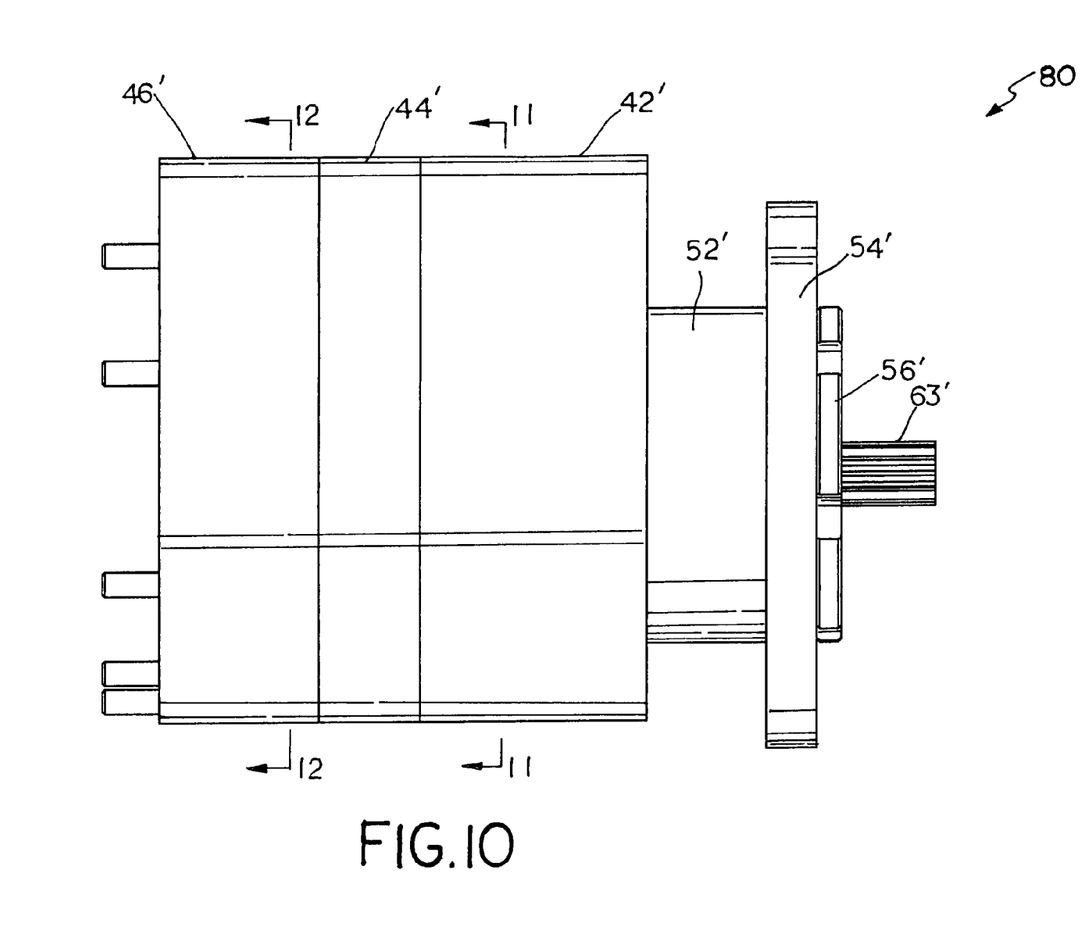
FIG. 10 is a side view of the gearbox of FIG. 9.
Figure 11:
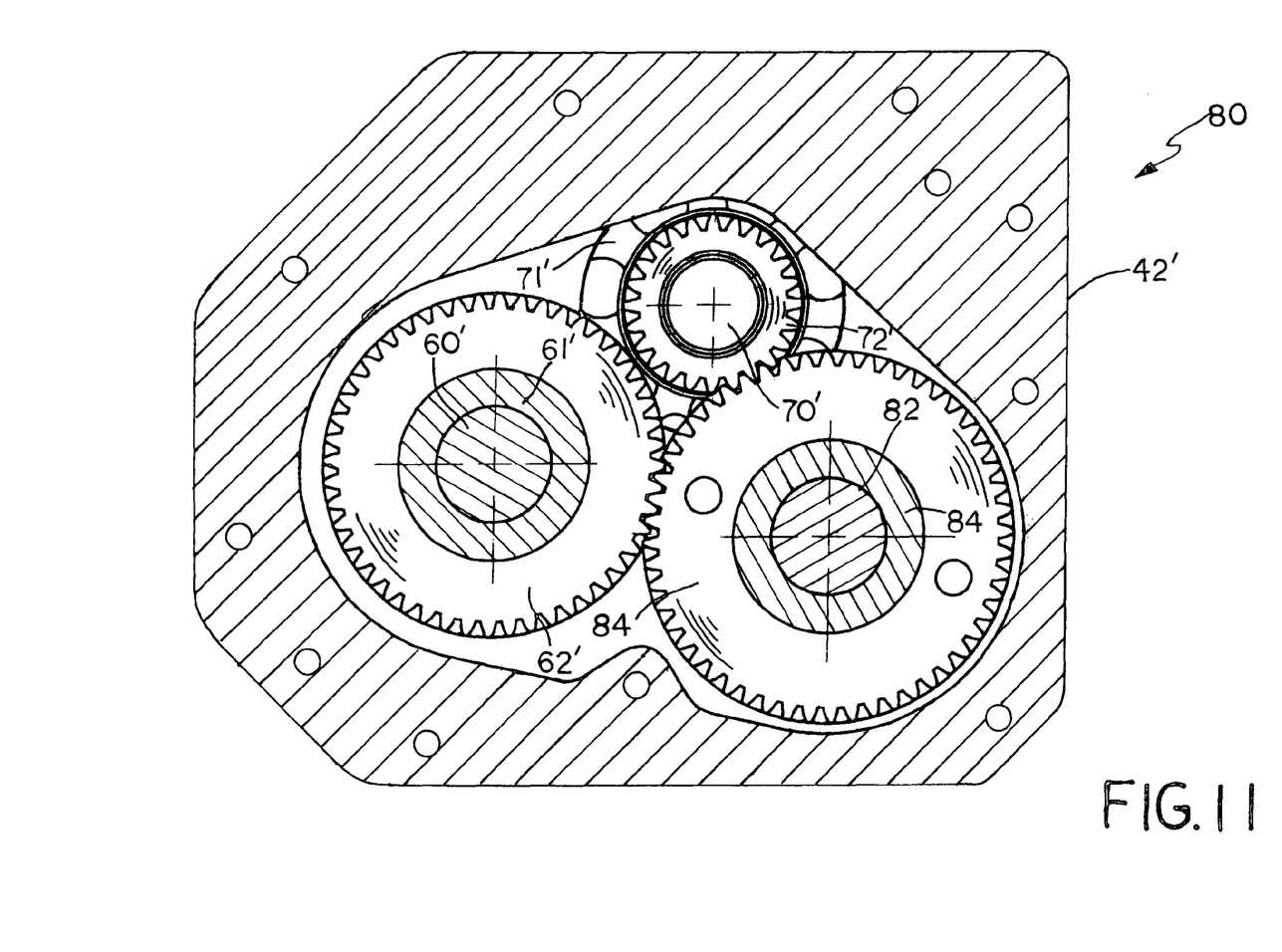
FIG. 11 is a sectional view of the gearbox of FIG. 9 taken along line 11-11.
Figure 12:
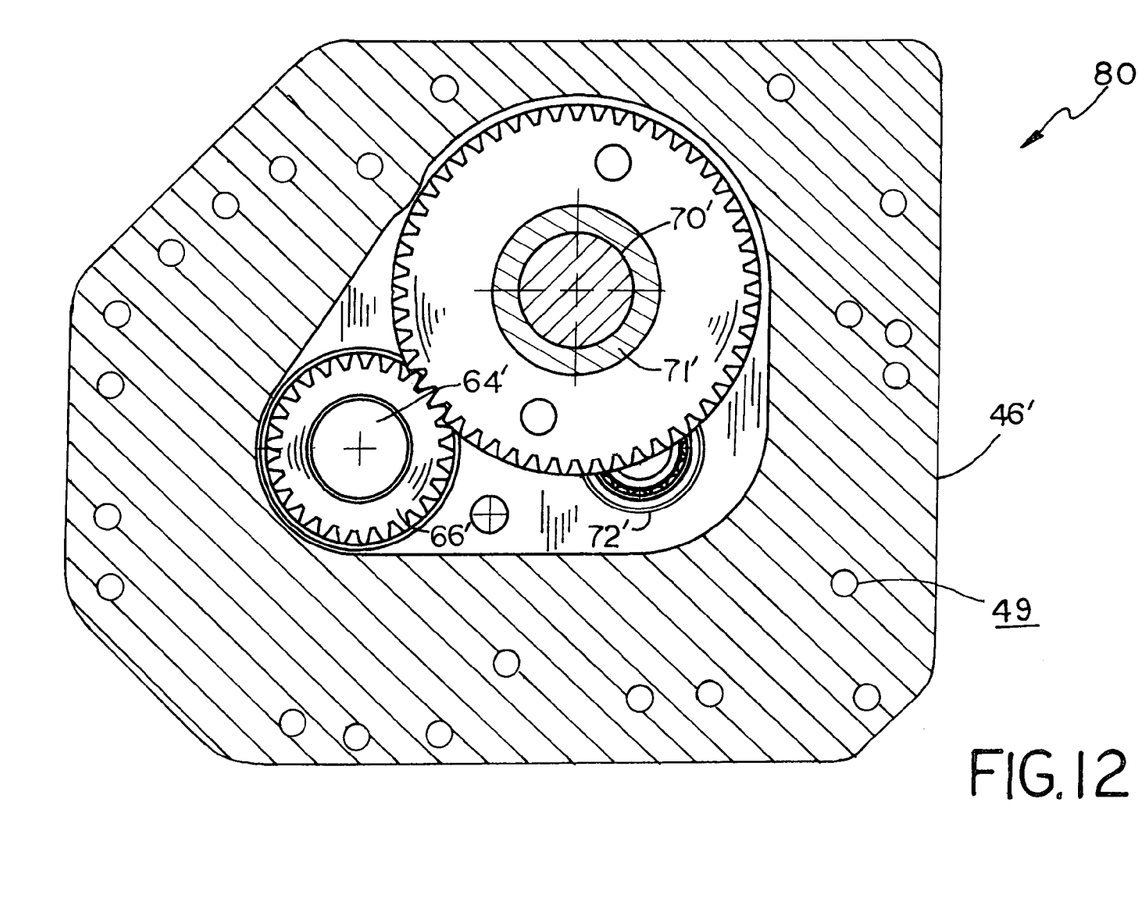
FIG. 12 is a sectional view of the gearbox of FIG. 9 taken along line 12-12.

Gearbox 40 directly and integrally connects PTO unit 20 and compressor 30 and transfers the rotation of PTO output shaft to the compressor input shaft at a reduced gear ratio. Gearbox 40 includes an aluminum gearbox housing formed by three machined housing plates 42, 44 and 46. Housing plates 42, 44 and 46 are bolted together by bolt fasteners 48. As custom in the art, gaskets and seals (not shown) are used to seal the interior of the interconnected housing plates. Housing plate 42 includes an tubular collar 52, which terminates in a mounting flange 54. Flange 54 abuts against PTO housing 22 and is sealed by a gasket 56. Housing plate 46 also forms part of the compressor housing 32, which partially encloses the internal components of the compressor. Compressor housing 32 is bolted directly against housing plate 46 and sealed by another gasket (not shown). Housing plates 42, 44 and 46 have a plurality of lubrication bores and ports 49. Certain of these lubrication ports 49 in housing plate 46 align with lubrication ports (not shown) in compressor housing 32, and provide fluid conduits for splash lubricating gearbox 40. Compressor fluid is drawn into gearbox 40 from compressor 30 by differential pressure and lubricates the gear set and bearing sets.

Each housing plate 42, 44 and 46 has a plurality of machined cavities, bores and vents within which the various gears, shafts, bearings and gaskets are disposed. As best shown in FIGS. 5-8, gearbox 40 includes three gear shafts: a drive shaft 60, a driven shaft 64 and an idler shaft 70. Drive shaft 60, driven shaft 64 and idler shaft 70 are coaxially aligned within the gearbox 40. Drive shaft 60 is journaled in a bearing set 61 disposed in housing plate 42. Idler shaft 70 is journaled in a bearing set 71 disposed in housing plate 46. Likewise, driven shaft 64 is journalled in its own bearing set (not shown) disposed in housing plate 44. Drive shaft 60 has a splined end 63 for connection to the output shaft of PTO unit 20 within housing collar 52. Alternatively, drive shaft 60 may be adapted for a press fit connection or connected using any other suitable connection mechanisms applicable to the particular PTO unit. Driven shaft 64 is press fit to the input shaft of compressor 30 but may be connected by a spline or yoke connections or other suitable mechanisms. Drive shaft 60 turns a drive gear 62 and driven shaft 64 turns a driven gear 66. Two reducer gears 72 and 74 are mounted to idler shaft 70. As shown, gears 62, 66, 72, and 74 have helical gear threads commonly used in gearbox applications. Reducer gear 72 meshes with drive gear 62 and reducer gear 74 meshes with driven gear 66. The outer diameter and size of gears 62, 66, 72 and 74 are selected to provide a reducing gear ratio of approximately 4 to 1.

FIGS. 9-12 illustrate another embodiment of the gearbox that is designated as reference numeral 80. Gearbox 80 is designed and intended to mate the output shaft of PTO units and input shaft of air compressors that rotate in opposite directions. Gearbox 80 is identical to gearbox 40 of FIGS. 1-8 in size, design and construction, except that gearbox 80 includes an additional idler shaft 82 and reversing gear 84. Reversing idler shaft 82 is journalled in a bearing set 83 disposed in housing plate 42' and turns reversing gear 84. Unlike in gearbox 40 of FIGS. 1-8, drive gear 62' does not mesh directly with reducer gear 72', but only meshes with reversing gear 84. Reversing gear 84 also meshes with reducer gear 72'. The addition of reversing gear 84 inverses, as well as, reduces the gear ration of PTO output shaft 24 for use as the input rotation of compressor 30.

One skilled in the art will note that combining the PTO unit, gearbox and air compressor into an integral unit eliminates the need for a separate drive line. By eliminating a separate drive line, the combination has a smaller footprint and reduced installation problems associated with locating the components beneath the undercarriage of a vehicle. Integrally mounting the combination to the transmission also reduces the installation difficulties by reducing fluid lines and consolidating component location. The PTO/gearbox/compressor combination is directly mounted to and supported from the side PTO provision of the vehicle transmission, which means the combination doesn't require additional bracing or mounting to other frame members. The aluminum construction of the integrated gearbox, PTO unit and compressor and modest size of the air compressor makes the combination lightweight and supportable by a standard utility vehicle transmission. Integrating the gearbox and compressor also allows the use of splash lubrication without the use of separate fluid lines.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. In a vehicle having an undercarriage and a transmission with a side mounted power take off (PTO) provision, an undercarriage combination comprising:

a power take off (PTO) unit operatively mounted to the PTO provision and extending from the transmission beneath the under carriage;

a gear box integrally mounted to and suspended from the power take off unit beneath the undercarriage; and an air compressor unit integrally mounted to and suspended from the gear box beneath the undercarriage, the PTO unit including a housing and a rotating output drive shaft, the compressor unit includes a housing and an input drive shaft, the gear box includes a housing integrally connecting the PTO housing and compressor housing, the gear box also includes a gear set disposed within the gearbox housing and operably connecting the PTO output drive shaft and the compressor input drive shaft for transmitting the rotational movement from the PTO output drive shaft to the compressor input drive shaft at a specified ratio of revolutions per minute.

2. The undercarriage combination of claim 1 wherein the gearbox housing forms an integral part of the compressor housing.

3. The undercarriage combination of claim 1 wherein the specified ratio is four to one.

* * * * *